No. 854,881. PATENTED MAY 28, 1907.
C. H. EVERS.
PORTABLE TEST METER.
APPLICATION FILED NOV. 23, 1905.

3 SHEETS—SHEET 1.

Witnesses
A. Dietz.
Inventor
CHRISTIAN H. EVERS.
By
Attorney

No. 854,881. PATENTED MAY 28, 1907.
C. H. EVERS.
PORTABLE TEST METER.
APPLICATION FILED NOV. 23, 1905.

3 SHEETS—SHEET 2.

Witnesses
A. Dietz
Norrie Welch

Inventor
CHRISTIAN H. EVERS.

By Robt. S. Johnston Jr.
Attorney

No. 854,881. PATENTED MAY 28, 1907.
C. H. EVERS.
PORTABLE TEST METER.
APPLICATION FILED NOV. 23, 1905.
3 SHEETS—SHEET 3.
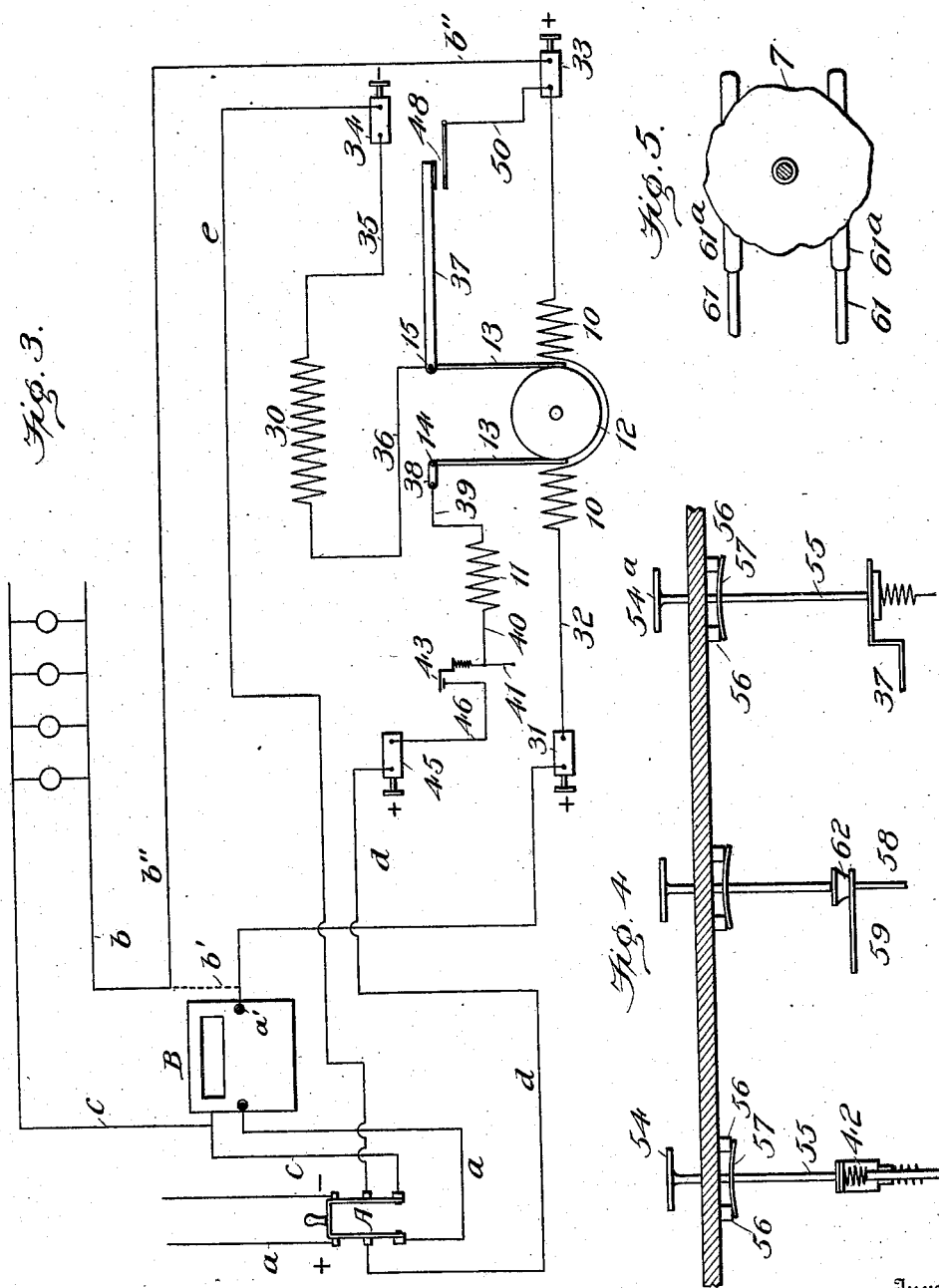
Witnesses
Edwin L. Bradford
P. H. Burch
Inventor
Christian H. Evers
By Robt. D. Johnston Jr.
Attorney

UNITED STATES PATENT OFFICE.

CHRISTIAN H. EVERS, OF BIRMINGHAM, ALABAMA.

PORTABLE TEST-METER.

No. 854,881.          Specification of Letters Patent.          Patented May 28, 1907.

Application filed November 23, 1905. Serial No. 288,770.

*To all whom it may concern:*

Be it known that I, CHRISTIAN H. EVERS, a citizen of the United States, residing at Birmingham, in the county of Jefferson and State of Alabama, have invented new and useful Improvements in Portable Test-Meters, of which the following is a specification.

My invention relates to improvements in test meters particularly designed and constructed for the purpose of portable use in testing the accuracy of electric house meters.

The object of my invention is to provide a meter which can promptly be brought into proper temperature condition for accurate testing, which is light and compact, and which provides novel means to lift the spindle for the registering disk off its jewel support and hold it so as not to be injured by the shaking or jarring, to which it will be subjected in handling from house to house.

My invention in its preferred form is illustrated in the accompanying drawings, in which:—

Figure 1:
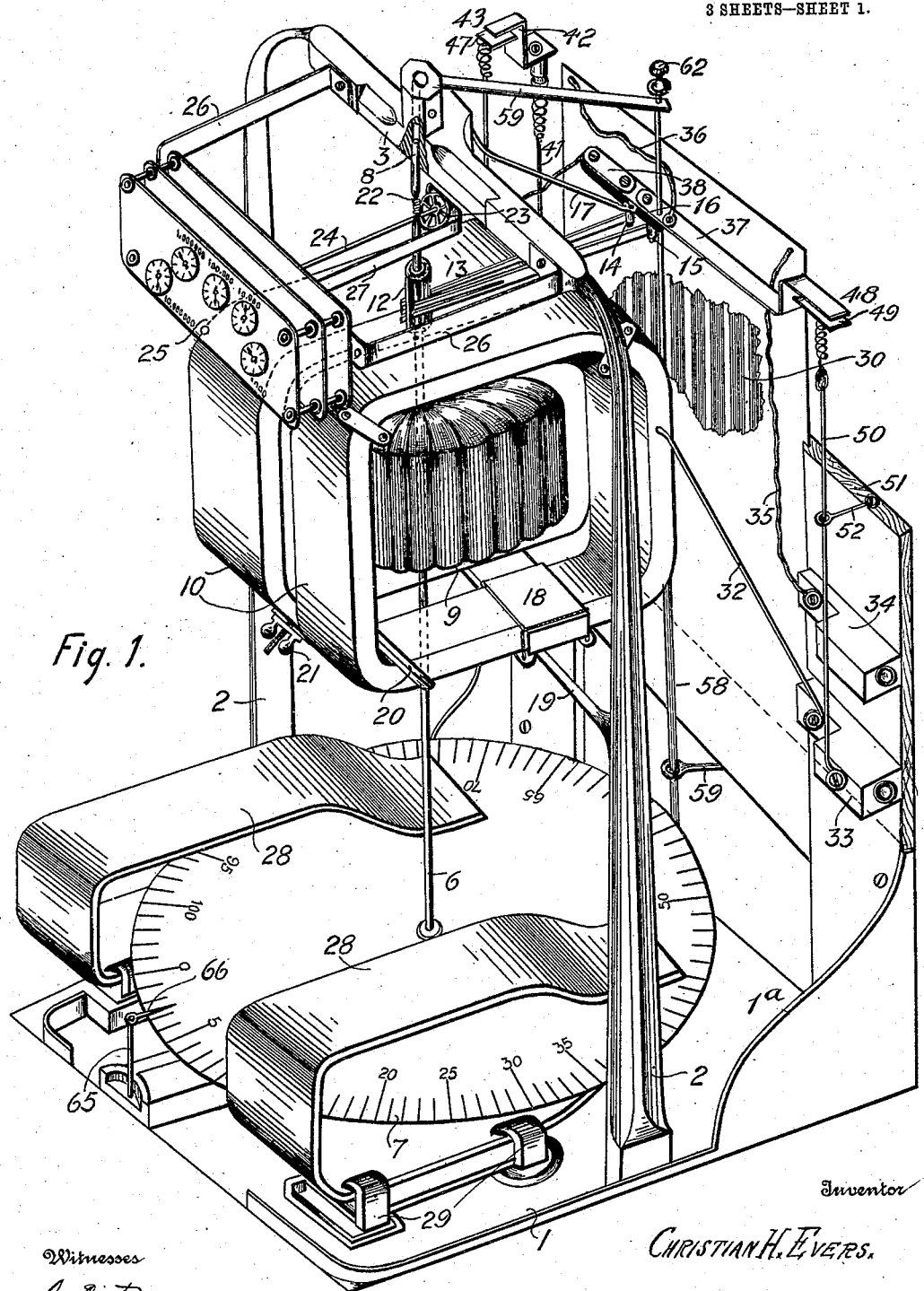
Figure 2:
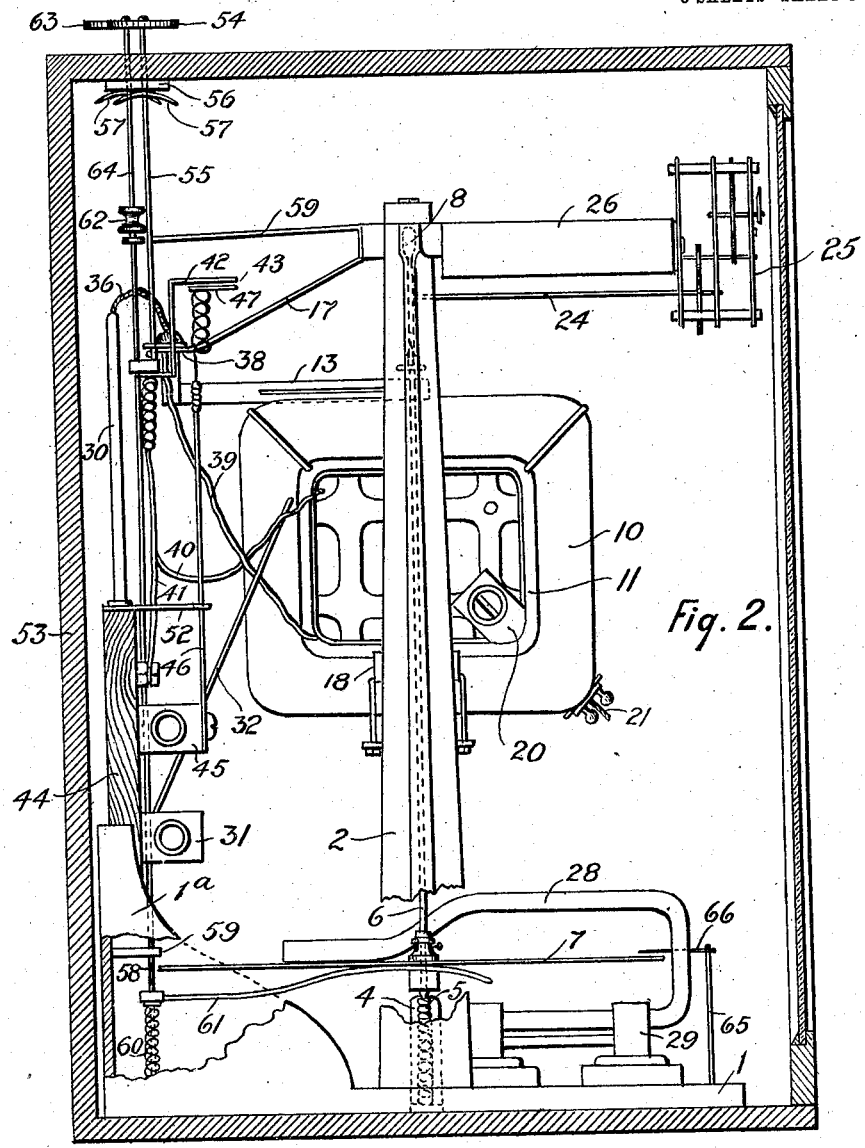

Figure 1, is a perspective view looking from one side of the test meter with the casing removed. Fig. 2, is a side elevation of the meter looking from the other side, the binding posts to which the line wires are connected being shown. Fig. 3, is a diagrammatic view of the circuits in the meter shown connected up with a house meter and circuits. Fig. 4, is a transverse sectional view through the top of the casing illustrating the several push buttons. Fig. 5, is a detail plan view of the disk supporting arms, the disk being broken away.

Similar reference numerals refer to similar parts throughout the drawings.

As illustrated my invention comprises a metallic supporting base 1 provided with vertical uprights 2, connected by an overhead cross bar 3. A standard 4 carries a jewel 5 held by screw retaining means at its upper end in the usual manner. Upon this jewel is normally supported a spindle 6 carrying a dial 7, subdivided to indicate fractions of watt seconds. A socket 8 for the upper end of the spindle is formed in or connected to the cross head 3. This forms an upper bearing for the spindle which permits of its free vertical adjustment therein for the purposes hereinafter described.

The armature 9 of the motor for moving the indicating mechanism is mounted on the spindle 6 and disposed within the field coils 10 and the adjustable shunt coils 11 (Fig. 2) which parts may be of any construction now in general use. The commutator 12 is engaged by the brushes 13 connected to the contact screws 14 and 15, which pass through the insulating block 16 suitably connected to a brace bar 17 supported from the cross bar 3. The field coils 10 are connected by clips 18 to a cross supporting bar 19 between the uprights 2. The adjustable shunt coils 11 are disposed at the left hand end of the field coils and connected to an arm 20, which is engaged by an adjusting screw device 21 to hold them in any desired relation to the coils 10. The adjustable shunt coils form no particular part of my present invention, the same being constructed and applied in a manner now commonly practiced with meters of the general type to which my invention is applicable. Near its upper end the spindle 6 is provided with a worm 22 which is engaged by a worm wheel 23 mounted on the shaft 24 which drives the dials of an indicating mechanism 25. This indicating mechanism is supported by bars 26 from the cross head 3 and has connected to it a bar 27, which is bent at its rear end to form a bearing for the rear end of the shaft 24. Two drag magnets 28 are connected by clips 29 to the base 1 and arranged so as to produce the desired lines of magnetic force in the dial 7. At the rear of the casing I provide a resistance 30 connected up in the manner hereinafter described.

The details of construction of the parts hereinbefore described may be varied or changed in any desired manner without affecting my invention, they being illustrated in the form now used in ordinary electric house meters.

The positive and negative line wires lead to a two point switch A which closes the circuits through the positive house wire $a$ to the house meter B. The current flows in the usual manner through this meter, and, when the test meter is not connected up, by wires $b'$ and $b$ to the work circuit returning by the negative house wire $c$ to switch A. To connect up the test meter, the house circuit is broken at $b'$ and the meter B connected up in series with the contact post 31 of the test meter. From this post the current flows by wire 32, through the field coils of the test meter to the contact post 33 and thence by wire $b''$ to wire $b$ and the work circuit. Thus the two meters are connected up in series with the work circuit. A wire $d$ is connected by a suitable clip to the positive arm of the switch A and carries a positive line-current to the contact post 45 of the test meter, whence it flows by a conductor 46 to the contact 47 of the potential switch 43, the contact 42 thereof being connected by wire 40 with the shunt coils 11 and by wire 39 with a plate 38 mounted on the insulator 16 and connected to the brush supporting contact screw 14. From this screw 14, when switch 43 is closed, current flows through the brushes and across the commutator to the screw 15 and along a spring switch arm 37, also mounted on the insulator 16, to the heating switch 48. The lower contact 49 of this switch is connected by a conductor 50 with the post 33. The switch arm 37 is connected by wire 36 with the resistance coils 30 through which the current flows to the contact post 34 by a wire 35. This post 35 is connected by wire $e$ and a suitable clip to the negative arm of the switch A.

The conductors 46 and 50 are formed of heavy wire terminating in light coils which support yieldingly the contacts 47 and 49, respectively, the heavy wires being connected by binding screws to the contact posts 45 and 33, respectively. The upper contact 42 of the potential switch 43 is formed of an angled metal plate supported on a spring coil mounted on a wire support or rod 41 which is bolted to a wooden block 44 which, in turn is bolted to the left hand rear extension $1^a$ of the base 1. This insulating block is grooved along its vertical inner edge to receive the envelop inclosing the resistance 30 and serves as an insulating support for the contact posts 31 and 45 and a guide 52 for the conductor 46. Similarly a wooden block 51 is bolted to the right hand extension $1^a$ and supports the posts 33 and 34, and the guide 52 for the conductor 50, being grooved to receive the resistance envelop.

It is my purpose to control the operation of the switches 43 and 48 from without the dust proof casing 53 which incloses the meter. To this end I provide two push buttons 54 and $54^a$ connected to stems 55 which pass through the top of the casing and between pairs of parallel cam blocks 56 secured to said top. Each stem carries a curved cam arm 57, which, when turned into engagement with the blocks, forces the stem downwardly. The stem of the button 54 is adapted to engage the contact plate 42 of the potential switch and the stem of the button $54^a$, the spring arm 37 of the heating switch. When moved downwardly by the cams, these stems will serve to close and hold the switches closed.

The operation of my invention as thus far described will be best understood by reference to the diagrammatic view of the circuits shown in Fig. 3. Assuming the switch A to be closed, and the post 31, of the test meter, connected up with the terminal $a'$ of the house meter, the direct connection $b'$ as indicated in dotted lines being broken, the positive current will flow in series through the house meter and field coils 10 to the lighting circuit. Upon closing the potential switch 43, the positive current will flow by wires $d$, 46, conductor 41, wire 40, through the shunt field coils 11 by wires 39, plate 38, screw 14, across the brushes to the screw 15. At this point, assuming the heating switch 48 to be open, the current flows through wire 36, resistance 30, wire 35, contact post 34, and wire $e$, back to the negative main. Under these conditions, assuming the current to be of ordinary lighting voltage, i. e., 110 volts, the circuit connection shown will deliver the current at about 50 per cent of its voltage to the resistance coils 30. To enable the test meter to register accurately the flow of current through the house meter, it is necessary that both meters should be brought to the same temperature condition, otherwise there would be a loss of the current in the test meter while it was being brought up to temperature which would exceed the loss in the house meter requisite to maintain it at the given temperature. It has been heretofore necessary to wait a number of minutes while the current was thus slowly flowing through the resistance 30 before the test meter was brought to the temperature of the house meter when the reading could be taken. It is the purpose of my invention to produce this heating of the test meter very rapidly so that hardly more than a fraction of a minute is required to bring it to the desired temperature condition. To this end I provide a heating switch 48 which, when closed, conducts the positive line current from the post 33 through arm 37 and wire 36 to the resistance. When switches 43 and 48 are closed, the voltage of the current entering the resistance is practically the full voltage of the line current and it therefore causes the resistance to heat rapidly to bring the test meter to the desired temperature condition. When this is obtained the switch 48 is opened, switch 43 remains closed during the testing, and the watt registering dial 7 is lowered in the manner hereinafter described and the process of comparing the registering of the two meters for test purposes is begun, the main supply current for the lighting circuit flowing in series through the field coils of both meters. The above described method of rapidly testing meters does not form a part of the protection claimed in this application, which relates more particularly to the novel apparatus which represents my preferred means for use in connection with such method. Under these conditions the accuracy of the house meter is tested in the usual manner by its correspondence with the test meter. In common practice the two meters are connected up in series so that their resistances, in series in the potential circuits, will co-act in resisting the flow of the current which must be depended upon for bringing the test meter to the proper temperature. As a result this latter meter heats very slowly and requires the current to flow through it twenty minutes, as an average, before it is ready for use. By the provision of the shunt circuits $d$ and $e$ from the service wire to the potential circuit of the test meter, I am enabled to shunt part of the current around the house meter to the resistance 30. When the switches 43 and 48 are closed, the current shunted around the house meter to the potential circuit, as well as the current flowing in series through the current circuits of the two meters, will join at the contact-post 15 and will flow together through the wire 36 and resistance 30 back to the service wires, thereby causing the current at practically full voltage to pass through the resistance 30. It will be evident that under these conditions the resistance 30 will become rapidly heated, and as before stated, an extended use of the instrument has demonstrated, that this result is obtained in less than a minute as an average. The economy of time and labor thus obtained is conclusive of the importance and practical value of my invention.

In further simplifying and improving test meters of this type for portable testing purposes, I find it desirable to provide a ready means for lifting and reseating the armature and disk spindle upon its jewel support, it being desirable to keep these parts separated except when in use. To this end I provide a stem 58 which is supported in guides 59, connected to the base 1 and cross bar 3, and, at its lower end, is engaged by a spring 60 supported on the base and tending normally to press the stem upwardly. This stem carries integral or suitably connected thereto a pair of arms 61, preferably provided with rubber sleeves $61^a$ and adapted to pass on either side of the spindle 6 and engage the under side of the dial 7. The action of the spring 60, through these arms, will be to lift the spindle off its jewel 5 and to hold it, by the frictional engagement of the rubber sleeves, from injurious movement due to rough handling. To enable the stem 58 to be operated from without the casing, I secure a nut or washer 62 on its upper end to provide a broad bearing surface which is adapted to be engaged by a short stem 64 which projects above the casing and to be depressed thereby until the arms 61 will lower the spindle upon the jewel and move out of frictional engagement with the disk 7. The stem 64 is provided with a curved cam arm 57 disposed between a pair of cam blocks 56 and adapted to engage them and act as hereinbefore described to hold this stem in its lowered position until the testing operation is completed. The stem 64 also projects above the top of the casing and in position to be operated, by means of its push button 63, in the same manner as the switch controlling stem 65.

I propose to mount the meter mechanism as hereinbefore described in a small compact casing 53 carrying the three push buttons for controlling the switches 43 and 48 and the operation of the stem 58. According to my construction, the meter is entirely inclosed, the dial 7 and registering mechanism 17 being visible through suitable glass openings in the front of the casing and the several movable parts being all controllable from without the casing which is also made dust proof.

To enable me to ascertain more accurately the fractions of watt seconds registered by the test meter and also to start it from a zero point, I provide at the front of the machine, a standard 65 which supports a needle or pointer 66 above the dial 7. This dial is subdivided to indicate fractions of a watt second. By opening and closing the switch 43 the dial may be caused to move slowly around until it assumes a zero position relatively to the needle. If now the testing commence, it may be conducted with greater accuracy as the test meter moves from a zero position and therefore registers exactly to a fraction the watt seconds and the necessity of estimating the exact amount registered is avoided.

My invention has been described in an illustrative form, as is required by the patent statutes, and I do not desire the claims, hereinafter defining my invention, to be construed as limited to the details of construction as above set forth, as they may be modified in a great variety of ways within the scope of my invention.

Having thus described my invention, what I claim as new and desire to secure by Letters Patent, is:—

1. In a test meter, a potential circuit which includes a resistance and suitable connections, a current circuit which includes field coils and suitable connections, and means to shunt the line current at substantially full voltage from said current circuit through the portion of said potential circuit including said resistance to heat the meter before utilizing it for the purpose of testing, as and for the purposes described.

2. In a test meter, a potential circuit which includes a resistance, an armature, commutator, brushes, and suitable connections, a current circuit which includes field coils and suitable connections, and means to connect said resistance in series with both of said circuits and pass the line current at full voltage through it, for the purposes described.

3. In a testing system for electrical meters, the combination with a test meter comprising, an armature, a commutator, a field, indicating devices, field and potential circuits, of a house meter supply mains and service wires therefor, said field circuit being in series with the house meter and the work circuit, said potential circuit being connected to said supply mains in shunt to said house meter, a resistance in said potential circuit, a switch and circuit connections controlled thereby for shunting the field current through said resistance, as and for the purposes described.

4. In an apparatus of the character described, a normally closed casing, a meter therein comprising, in combination, field coils, an armature, a commutator, brushes, an armature shaft, indicating devices driven thereby, and circuit connections forming field and armature circuits, a make and break switch in said latter circuit disposed within the casing, and means, such as a press button, for readily controlling said switch from without said casing, substantially as and for the purposes described.

5. In an apparatus of the character described, a normally closed casing, a meter therein comprising, in combination, field coils, an armature, a commutator, brushes, an armature shaft, indicating devices driven thereby, and circuit connections forming field and potential circuits, a resistance in said latter circuit, circuit connections controlled by two switches in said casing, one switch acting to make and break the potential circuit, and one to shunt said field current through said resistance, and means for controlling said switches, which means project without said casing.

6. In an apparatus of the character described, a substantially dust proof outer casing, a meter within said casing comprising a potential circuit in a shunt to a main circuit, a field circuit in series with said main circuit, a resistance in said potential circuit, a shunt circuit connecting said potential and field circuits, and a switch on said latter circuit which is operable from without said casing.

7. In an apparatus of the character described, an outer casing, a meter within said casing comprising potential and current circuits, a disk subdivided to indicate fractions of watt seconds, a pointer disposed adjacent to said disk, a plurality of dials for indicating watt seconds, an armature shaft operatively connected to said disk and dials, suitable sight openings in said casing, which is substantially dust proof, through which said disk and dials may be inspected, a switch in said potential circuit, and means for operating said switch from without the casing.

8. In a meter comprising a casing an armature, a shaft driven thereby and a fixed jewel support for said shaft, the combination therewith, of a spring pressed device which engages said shaft or parts connected therewith and tends normally to hold it off its jewel support, and means disposed without said casing to move said device against said spring action to lower the shaft upon the jewel support and lock it in said lowered position, for the purposes described.

9. In an apparatus of the character described, a normally closed outer casing, a meter therein having an armature shaft, an indicating disk connected to said shaft, a jewel support for said shaft, a spring pressed device adapted to engage the under side of said disk and lift said shaft off its jewel, and means for operating said device from without said casing, as and for the purposes described.

10. In a portable test meter inclosed within a dust proof casing, the combination with an armature shaft thereof and its jewel support, of means operable from without said casing for lifting said shaft off its jewel support and holding it against displacement when the meter is not in service, said means comprising a pair of spring pressed rubber covered arms which pass on each side of said shaft and engage parts movable therewith.

11. The combination with a test meter having a current circuit adapted to be connected up in series between the house meter and the service mains, of a potential circuit in said test meter which includes a resistance and is connected in a shunt around said house meter to the supply mains, and switch means to shunt the current from said current circuit through said resistance.

12. In a test meter, the combination with an armature, field coils, a commutator, an armature shaft, indicating mechanism movable thereby, and circuit connections, of a resistance, and a switch to connect said field coils and armature in multiple with said resistance across the mains, as and for the purposes described.

13. In a meter for testing the accuracy of a house meter in measuring the flow of current to a consumption circuit, the combination of an armature commutator, an armature shaft and indicating mechanism movable thereby, of a current or field circuit adapted to be connected in series with the house meter and consumption circuit and a potential or armature circuit, said latter circuit comprising a resistance, a switch, and connections controlled by said switch to shunt the full service current through said fields and resistance, as and for the purposes described.

14. A test meter comprising a field circuit through which the current to be measured is adapted to flow to the consumption circuit, a potential circuit in a shunt across the supply mains, a resistance in said potential circuit, a normally open shunt circuit leading from the discharge end of said field circuit to the potential circuit in advance of said resistance, and a switch in said shunt circuit.

15. A meter for testing the accuracy of a house meter in measuring the flow of current to a consumption circuit, said meter comprising armature and field coils, potential and current circuits which respectively include said coils, a main circuit, said current circuit being adapted to be connected in shunt to said main circuit and in series with said house meter and consumption circuit, a resistance in said potential circuit, switch means to shunt current flowing through said meter circuits around said consumption circuit and through said resistance, and indicating mechanism adapted to be operated by said armature.

In testimony whereof I have hereunto set my hand in presence of two subscribing witnesses.

CHRISTIAN H. EVERS.

Witnesses:
A. R. FORSYTH,
NOMIE WELSH.